US012782947B2

(12) United States Patent
Iwahori et al.

(10) Patent No.: US 12,782,947 B2
(45) Date of Patent: Nov. 3, 2026

(54) CONTROL DEVICE, SYSTEM, AND CONTROL METHOD

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP); Jyunya Katou, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/931,080

(22) Filed: Oct. 30, 2024

(65) Prior Publication Data

US 2025/0251727 A1 Aug. 7, 2025

(30) Foreign Application Priority Data

Feb. 1, 2024 (JP) ................................ 2024-013988

(51) Int. Cl.

*G05D 1/225* (2024.01)
*B62D 65/18* (2006.01)
*G05D 107/70* (2024.01)

(52) U.S. Cl.

CPC ............ *G05D 1/225* (2024.01); *B62D 65/18* (2013.01); *G05D 2107/70* (2024.01)

(58) Field of Classification Search

None

See application file for complete search history.

(56) References Cited

U.S. PATENT DOCUMENTS 5,509,190 A * 4/1996 Nakagawa .............. B23P 19/10 29/784
11,613,321 B1 3/2023 Paskell
2017/0320529 A1 11/2017 Nordbruch
2023/0145508 A1* 5/2023 Kaphengst ....... G05B 19/41805 701/24

FOREIGN PATENT DOCUMENTS

JP 2017-538619 A 12/2017

* cited by examiner

*Primary Examiner* — Hongye Liang
(74) *Attorney, Agent, or Firm* — SoraIP, Inc.

(57) ABSTRACT

A control device for controlling assembling of a part to a moving body in a manufacturing process of a moving body that can be driven by unmanned operation, the control device comprising: a control command unit that instructs the moving body to stop at a first stop target position at which a stop assembling, which is an assembling of a part to a moving body that is stopped, is executed; and an information acquisition unit that acquires first information that is information on success or failure of the stop assembling, wherein the control command unit further instructs the moving body to move to a second stop target position, which is a position where the stop assembling is executed again, when first information related to the failure of the stop assembling at the first stop target position is acquired.

7 Claims, 10 Drawing Sheets

CONTROL DEVICE, SYSTEM, AND CONTROL METHOD

CROSS-REFERENCE TO RELATED APPLICATION

This application claims priority to Japanese Patent Application No. 2024-013988 filed on Feb. 1, 2024, incorporated herein by reference in its entirety.

BACKGROUND

1. Technical Field

The present disclosure relates to a control device, a system, and a control method.

2. Description of Related Art

There is known a technique of driving a vehicle in an unattended manner through remote control in a process of manufacturing the vehicle (Japanese Unexamined Patent Application Publication (Translation of PCT Application) No. 2017-538619 (JP 2017-538619 A), for example).

SUMMARY

There has been studied stop assembly in which a component is attached to a vehicle in a stopped state by controlling a robot in a process of manufacturing the vehicle. However, JP 2017-538619 A does not sufficiently examine the countermeasures against a case where such stop assembly fails. Such a problem is common not only to vehicles but also to any mobile bodies.

The present disclosure can be implemented in the following aspects.

(1) An aspect of the present disclosure provides a control device that controls assembly of a component to a mobile body that is able to travel through unattended driving in a process of manufacturing the mobile body. The control device includes: a control command unit that instructs the mobile body to stop at a first stop target position at which stop assembly is to be executed, the stop assembly being assembly of the component to the mobile body that has been stopped; and an information acquisition unit that acquires first information as information about whether the stop assembly is successful. The control command unit further instructs the mobile body to move to a second stop target position at which the stop assembly is to be executed again, when the first information about a failure of the stop assembly at the first stop target position is acquired. With the control device of this aspect, the mobile body is moved to the second stop target position when the first information is acquired. Therefore, the stop assembly can be attempted again at the second stop target position, and the component can be appropriately assembled to the mobile body. The first information relates to the fact that the component has not been able to be assembled to the mobile body through the stop assembly at the first stop target position. The stop assembly is executed again at the second stop target position.

(2) In the above aspect, when the first information about a failure of the stop assembly at the second stop target position is acquired, the control command unit may execute at least one of: instructing the mobile body to continue a stopped state; instructing a following mobile body as another mobile body traveling following the mobile body to decelerate or stop; and notifying an administrator of the failure of the stop assembly at the second stop target position. With the control device of this aspect, when the first information is acquired, the control command unit executes at least one of: instructing the mobile body to continue the stopped state; instructing the following mobile body to decelerate or stop; and notifying the administrator of the failure of the stop assembly at the second stop target position. The first information relates to the fact that the component has not been able to be assembled to the mobile body through the stop assembly at the second stop target position. There may be a case where the mobile body is instructed to continue the stop state or the following mobile body is instructed to decelerate or stop. In this case, it is possible to suppress travel of at least one of the mobile body and the following mobile body in a situation where the stop assembly at the second stop target position was not successful, that is, in a situation where there is a possibility of the occurrence of any abnormality. When the administrator is notified of the failure of the stop assembly at the second stop target position, meanwhile, it is possible to suppress the continuation of a situation where there is a possibility of the occurrence of any abnormality.

(3) In the above aspect, when the first information about a success of the stop assembly at the second stop target position is acquired, the control command unit may instruct a following mobile body as another mobile body traveling following the mobile body to stop at the second stop target position. With the control device of this aspect, when the first information is acquired, the following mobile body is instructed to stop at the second stop target position. Therefore, the following vehicle can be stopped from the beginning at the second stop target position at which the stop assembly has been successful. As a result, it is possible to suppress a failure of the stop assembly of the following vehicle. The first information relates to the fact that the stop assembly was successful at the second stop target position.

(4) In the above aspect, the second stop target position may be specified using second information as information about a position at which an assembly device that executes the stop assembly has attempted the stop assembly at the first stop target position. With the control device of this aspect, the second stop target position is specified using the second information. The second information is information about the position at which the assembly device that executes the stop assembly has attempted the stop assembly at the first stop target position. Therefore, the second stop target position can be set based on the position at which the stop assembly has been attempted at the first stop target position. As a result, it is possible to easily assemble the component appropriately to the mobile body at the second stop target position.

(5) In the above aspect, the component may have been retracted to a position at which the component is not in contact with the mobile body at a time point before movement of the mobile body to the second stop target position is started. With the control device of this aspect, the component has been retracted to the position at which the component is not in contact with the mobile body at the time point before the movement of the mobile body to the second stop target position is started. Therefore, it is possible to start the movement of the mobile body in a state in which the travel of the mobile body is not hindered by contact between the mobile body and the component.

(6) In the above aspect, the component may have been retracted to a position at which the component is not in contact with the mobile body while the mobile body is moving to the second stop target position. With the control device of this aspect, the component has been retracted to the position at which the component is not in contact with the mobile body while the mobile body is moving to the second stop target position. Therefore, it is possible to suppress the movement of the mobile body from being hindered by contact between the mobile body and the component while the mobile body is moving to the second stop target position.

(7) Another aspect of the present disclosure provides a system that controls assembly of a component to a mobile body that is able to travel through unattended driving in a process of manufacturing the mobile body. The system includes: a control command unit that instructs the mobile body to stop at a first stop target position at which stop assembly is to be executed, the stop assembly being assembly of the component to the mobile body that has been stopped; and an information acquisition unit that acquires first information as information about whether the stop assembly is successful. The control command unit further instructs the mobile body to move to a second stop target position at which the stop assembly is to be executed again, when the first information about a failure of the stop assembly at the first stop target position is acquired. With the system of this aspect, the mobile body is moved to the second stop target position at which the stop assembly is to be executed again, when the component has not been able to be assembled to the mobile body through the stop assembly at the first stop target position. Therefore, the stop assembly can be attempted again at the second stop target position, and the component can be appropriately assembled to the mobile body.

(8) Another aspect of the present disclosure provides a control method of controlling assembly of a component to a mobile body that is able to travel through unattended driving in a process of manufacturing the mobile body. The control method includes: instructing the mobile body to stop at a first stop target position at which stop assembly is to be executed, the stop assembly being assembly of the component to the mobile body that has been stopped; acquiring first information as information about whether the stop assembly is successful; and further instructing the mobile body to move to a second stop target position at which the stop assembly is to be executed again, when the first information about a failure of the stop assembly at the first stop target position is acquired. According to the control method of this aspect, the mobile body is moved to the second stop target position at which the stop assembly is to be executed again, when the component could not be assembled to the mobile body through the stop assembly at the first stop target position. Therefore, the stop assembly can be attempted again at the second stop target position, and the component can be appropriately assembled to the mobile body.

(9) Another aspect of the present disclosure provides a mobile body that is able to travel through unattended driving in a process of manufacturing the mobile body. The mobile body includes: a control command unit that stops the mobile body at a first stop target position at which stop assembly is to be executed, the stop assembly being assembly of a component to the mobile body that has been stopped; and an information acquisition unit that acquires first information as information about whether the stop assembly is successful. The control command unit moves the mobile body to a second stop target position at which the stop assembly is to be executed again, when the first information about a failure of the stop assembly at the first stop target position is acquired. With the mobile body of this aspect, the mobile body is moved to the second stop target position at which the stop assembly is to be executed again, when the component could not be assembled to the mobile body through the stop assembly at the first stop target position. Therefore, the stop assembly can be attempted again at the second stop target position, and the component can be appropriately assembled to the mobile body.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

A-1. System Configuration

Figure 1:
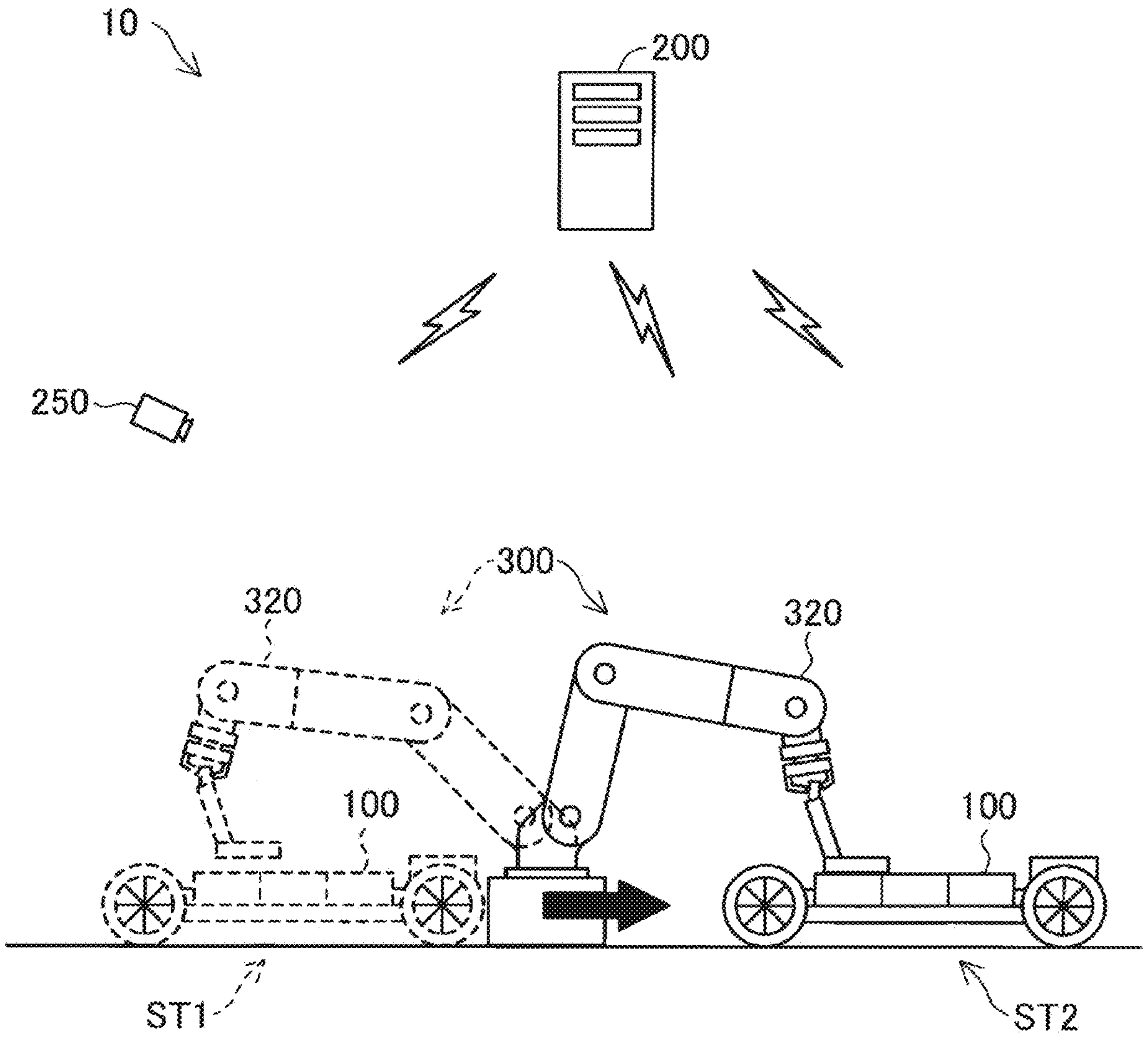
FIG. 1 is an explanatory diagram illustrating a configuration of a system according to a first embodiment.

FIG. 1 is an explanatory diagram illustrating a configuration of a system 10 according to a first embodiment. The system 10 is used, for example, in a factory that manufactures the vehicle 100. In the present embodiment, the vehicle 100 are battery electric vehicle (BEV). The vehicle 100 is not limited to a battery electric vehicle, and may be, for example, a gasoline-powered vehicle, a hybrid electric vehicle, or a fuel cell electric vehicle.

The system 10 includes a server device 200, at least one external sensor 250, and an assembly robot 300. The system 10 controls the assembly of components to the vehicle 100 in a factory KJ that manufactures the vehicle 100. The vehicle 100 is configured to be able to travel by unmanned driving. The vehicle 100 is in a state of being manufactured, and assembling work of components is performed by the assembly robot 300 with respect to the vehicle 100 traveling by the unmanned driving. In the present embodiment, the vehicle 100 travels by unmanned driving in the form of a so-called platform. Note that the vehicle 100 may be referred to as a moving body, and the assembly robot 300 may be referred to as an assembly device.

In the present disclosure, "unmanned driving" means driving that does not depend on a driving operation of a passenger riding on the vehicle 100. "Driving operation" means an operation related to at least one of "running," "turning," and "stopping" of the vehicle 100. The unmanned driving is realized by automatic or manual remote control using a device located outside the vehicle 100 or by autonomous control of the vehicle 100. A passenger who does not perform a driving operation may be on the vehicle 100 traveling by the unmanned driving. The passenger who does not perform the driving operation includes, for example, a person who is simply seated in the driver's seat of the vehicle 100 or a person who performs an action different from the driving operation. The action different from the driving operation includes, for example, an assembling operation of a component to the vehicle 100, an inspection of the vehicle 100, an operation of switches provided in the vehicle 100, and the like. Driving by the driver's driving operation may be referred to as "manned driving".

The external sensor 250 is located outside the vehicle 100. The external sensor 250 is used to detect the position and orientation of the vehicle 100. In the present embodiment, the external sensor 250 is a camera installed in a factory. The external sensor 250 includes a communication device (not shown), and can communicate with the server device 200 by wired communication or wireless communication. Note that the external sensor 250 is not limited to a camera, and may be, for example, a LiDAR.

Figure 2:
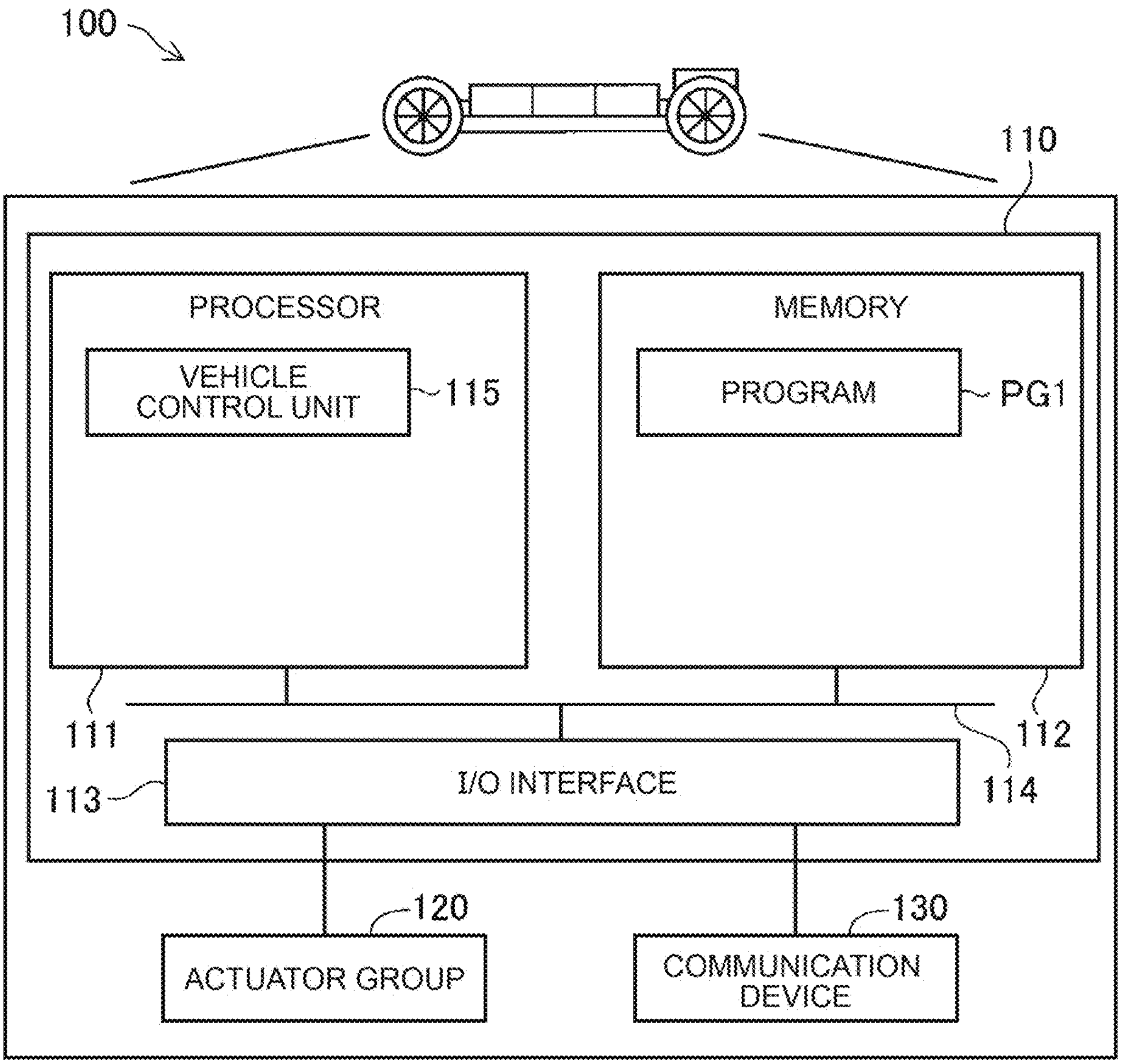
FIG. 2 is an explanatory diagram illustrating a configuration of a vehicle according to the present embodiment.

FIG. 2 is an explanatory diagram illustrating a configuration of the vehicle 100 according to the present embodiment. The vehicle 100 includes a vehicle control device 110, an actuator group 120, and a communication device 130. The vehicle control device 110 is configured to control each unit of the vehicle 100. The actuator group 120 includes at least one actuator driven under the control of the vehicle control device 110. The communication device 130 is configured to communicate with the server device 200 by wireless communication. In the present embodiment, the actuator group 120 includes an actuator of a driving device for accelerating the vehicle 100. In the present embodiment, the actuator group 120 includes an actuator of a steering device for changing the traveling direction of the vehicle 100. In the present embodiment, the actuator group 120 includes an actuator of a braking device for decelerating the vehicle 100. The driving device includes a battery, a traveling motor driven by electric power of the battery, and wheels rotated by the traveling motor. The actuator of the drive device includes a traveling motor.

The vehicle control device 110 includes a computer including a processor 111, a memory 112, an input/output interface 113, and an internal bus 114. The processor 111, the memory 112, and the input/output interface 113 are bidirectionally communicably connected to each other via an internal bus 114. An actuator group 120 and a communication device 130 are connected to the input/output interface 113. The processor 111 executes the program PG1 stored in the memory 112 to realize various functions including functions as the vehicle control unit 115.

The vehicle control unit 115 controls the actuator group 120 to cause the vehicle 100 to travel. The vehicle control unit 115 can cause the vehicle 100 to travel by controlling the actuator group 120 using the travel control signal received from the server device 200. The travel control signal is a control signal for causing the vehicle 100 to travel. In the present embodiment, the travel control signal includes the acceleration and the steering angle of the vehicle 100 as parameters. In other embodiments, the travel control signal may include the speed of the vehicle 100 as a parameter in place of or in addition to the acceleration of the vehicle 100. In addition, when the occupant is on the vehicle 100, the vehicle control unit 115 can cause the vehicle 100 to travel by controlling the actuator group 120 in accordance with the driving operation of the occupant. Further, the vehicle control unit 115 can cause the vehicle 100 to travel by controlling the actuator group 120 in accordance with the travel control signal received from the server device 200, regardless of whether or not the occupant is on the vehicle 100.

Figure 3:
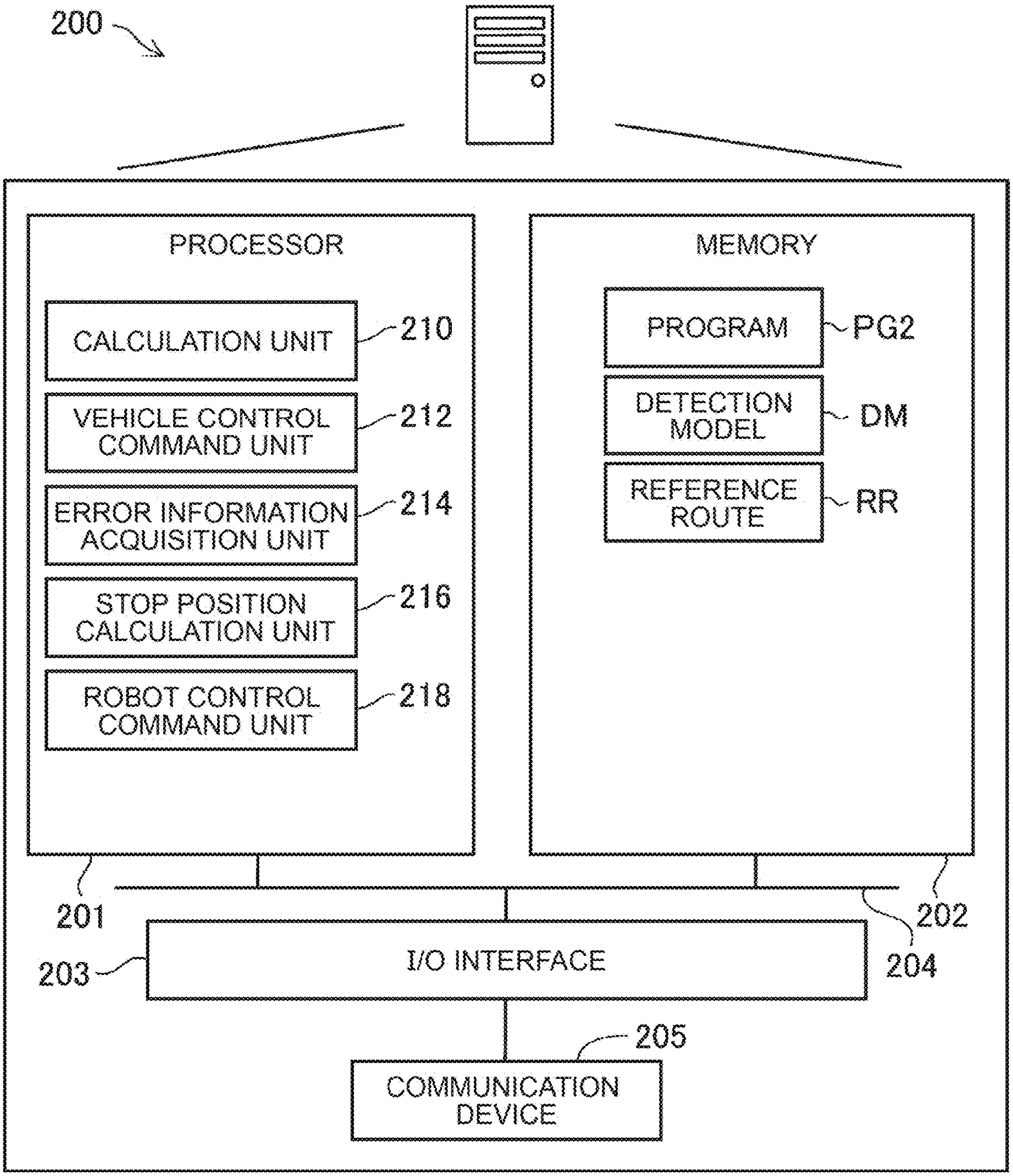
FIG. 3 is an explanatory diagram illustrating a configuration of a server apparatus according to the present embodiment.

FIG. 3 is an explanatory diagram illustrating a configuration of the server device 200 according to the present embodiment. The server device 200 includes a computer including a processor 201, a memory 202, an input/output interface 203, and an internal bus 204. The processor 201, the memory 202, and the input/output interface 203 are bidirectionally communicably connected to each other via an internal bus 204. A communication device 205 for communicating with the vehicle 100 by wireless communication is connected to the input/output interface 203. In the present embodiment, the communication device 205 can communicate with the external sensor 250 and the assembly robot 300 by wired communication or wireless communication. The processor 201 executes program PG2 stored in advance in the memory 202. Accordingly, the processor 201 functions as the calculation unit 210, the vehicle control command unit 212, the error information acquisition unit 214, the stop position calculation unit 216, and the robot control command unit 218. As will be described later, in the present embodiment, the server device 200 controls the assembly of components to the vehicle 100 in the manufacturing process of the vehicle 100. That is, the server device 200 corresponds to a "control device" in the present disclosure.

In the present embodiment, the calculation unit 210 calculates the vehicle position information using the detection result output from the external sensor 250. The vehicle position information includes information on the position and orientation of the vehicle 100.

The vehicle control command unit 212 generates a vehicle control command using the vehicle position information. The vehicle control command unit 212 generates the above-described travel control signal as the vehicle control command. Note that the remote control unit 220 may generate and output not only the travel control signal but also a control signal for controlling various accessories provided in the vehicle 100 and actuators for operating various kinds of equipment such as a wiper, a power window, and a lamp. That is, the vehicle control command unit 212 may operate the various types of equipment and the various accessories by remote control. In the following description, among the vehicle control commands generated by the vehicle control command unit 212, a travel control signal that instructs the vehicle 100 to stop is also referred to as a "stop command", and a travel control signal that instructs the vehicle 100 to travel is also referred to as a "travel command".

In the present embodiment, the vehicle control command unit 212 performs control to stop the vehicle 100 when the vehicle 100 reaches the component assembling position in the manufacturing process of the vehicle 100, and resume the traveling of the vehicle 100 after completion of the stop assembling described later. The "component assembling position" means a position at which the assembly robot 300 assembles a component to the vehicle 100 in the manufacturing process of the vehicle 100. Details of the control will be described later. The vehicle control command unit 212 of the present embodiment corresponds to a "control command unit" in the present disclosure.

The error information acquisition unit 214 acquires assembly error information. "Assembly error information" means information related to an assembling error. "Assembly error" means a state in which the component is not properly assembled to the vehicle 100 even when the component assembling operation is executed by the assembly robot 300. That is, the assembly error information means information indicating that the assembly robot 300 was unable to assemble a component to the vehicle 100. The assembly error information corresponds to "first information" in the present disclosure. In the present embodiment, the error information acquisition unit 214 acquires, as the assembly error information, an error signal output from the assembly robot 300 as will be described later. The error information acquisition unit 214 corresponds to an "information acquisition unit" in the present disclosure.

The robot control command unit 218 generates an operation control signal for operating the assembly robot 300, and transmits the operation control signal to the assembly robot 300. The assembly robot 300 that has received the operation control signal operates in accordance with the operation control signal. In the following description, an operation control signal that instructs the assembly robot 300 to execute an assembling operation of a component to the vehicle 100 is also referred to as an "assembly instruction". In the present embodiment, the operation control signal is generated as a signal that specifically instructs the movement amount of each unit constituting the assembly robot 300.

In the present embodiment, the robot control command unit 218 generates an operation control signal of the assembly robot 300 so that the assembly robot 300 performs an assembling operation in a stopped state in which the vehicle 100 is stopped at the above-described component assembling position. In the following description, the assembly mode of such a component is also referred to as "stop assembly". In the stop assembly, since the work is performed in a state in which the vehicle 100 is stopped, it is possible to perform the work with high difficulty, and it is possible to improve the work accuracy. In addition, the stop assembly has an advantage that coordinated control of the travel of the vehicle 100 and the operation of the assembly robot 300 is unnecessary.

The stop position calculation unit 216 calculates the second stop target position ST2 when an assembly error occurs in the stop assembly in the first stop target position ST1 set in advance as the component assembly position described above. In FIG. 1, the vehicle 100 and the assembly robot 300 at the time of stop assembly in the first stop target position ST1 are indicated by broken lines, and the vehicle 100 and the assembly robot 300 at the time of stop assembly in the second stop target position ST2 are indicated by broken lines. The "second stop target position ST2" means a position where the stop assembly is performed again. The stop position calculation unit 216 calculates the second stop target position ST2 by using the information about the position where the stop assembly is attempted in the first stop target position ST1. Such information corresponds to "second information" in the present disclosure.

More specifically, the stop position calculation unit 216 acquires captured images at the time of stop assembly in the first stop target position ST1 by, for example, a camera as the external sensor 250. For example, the stop position calculation unit 216 detects a positional relationship between the vehicle 100 and the components in the captured images, and calculates the second stop target position ST2 according to the positional relationship. Further, the stop position calculation unit 216 estimates a contact state between the vehicle 100 and the component using, for example, the motor load of the assembly robot 300, and calculates the second stop target position ST2 according to the contact state. By calculating the second stop target position ST2 in this manner, the second stop target position ST2 can be set in accordance with the positional relation between the vehicle 100 and the components and the touching condition. As a result, the components can be easily assembled to the vehicle 100 in the second stop target position ST2. The second stop target position ST2 is determined such that, when the vehicle 100 stops at the second stop target position ST2, the position at which the component is installed with respect to the vehicle 100 is within the movable range of the assembly robot 300.

Figure 4:
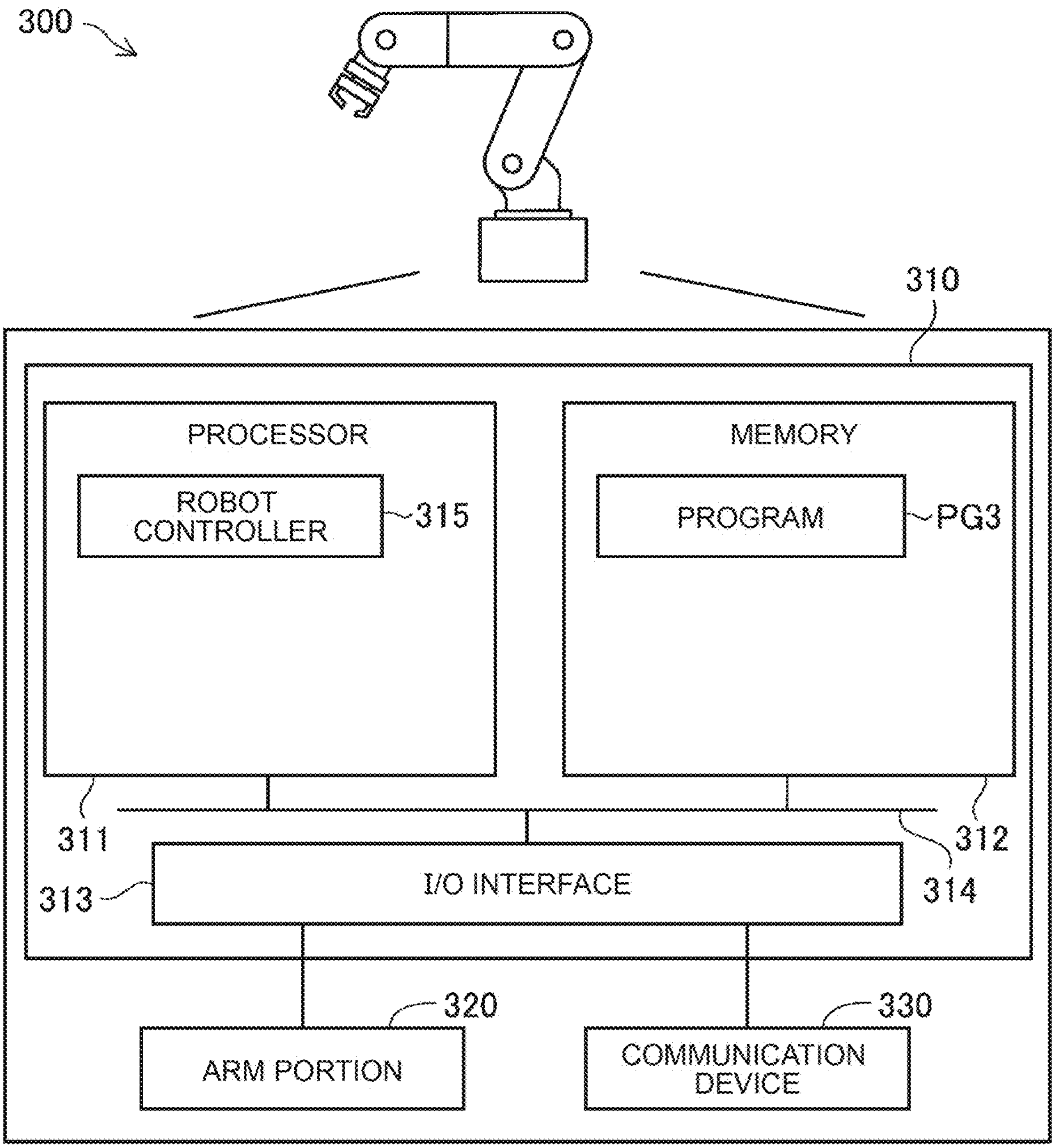
FIG. 4 is an explanatory diagram illustrating a configuration of the assembly robot according to the present embodiment.

FIG. 4 is an explanatory diagram illustrating a configuration of the assembly robot 300 according to the present embodiment. The assembly robot 300 includes a robot control device 310, an arm portion 320, and a communication device 330. In the present embodiment, the robot control device 310 controls each unit of the assembly robot 300. The arm portion 320 is constituted by a vertically articulated robot arm. An end effector for gripping a component is attached to a distal end portion of the arm portion 320. In the present embodiment, the end effector is configured to sandwich a component. The communication device 330 can communicate with the server device 200 by wired communication or wireless communication. Note that the arm portion 320 is not limited to a vertical articulated robot arm, and may be constituted by, for example, a horizontal articulated robot arm, an orthogonal robot arm, or a parallel link robot arm. The end effector may be configured to attract a component rather than pinching the component. Although not shown, the assembly robot 300 includes a sensor that detects a motor load for driving the arm portion 320, an impact force at the time of assembling a component, and the like. The assembly robot 300 corresponds to an "assembly apparatus" in the present disclosure.

The robot control device 310 includes a computer including a processor 311, a memory 312, an input/output interface 313, and an internal bus 314. The processor 311, the memory 312, and the input/output interface 313 are bidirectionally communicably connected to each other via an internal bus 314. An arm portion 320 and a communication device 330 are connected to the input/output interface 313.

In the present embodiment, the processor 311 functions as the robot control unit 315 by executing a program PG3 stored in advance in the memory 312. The robot control unit 315 receives the operation control signal, controls each unit of the assembly robot 300 including the arm portion 320 in response to the operation control signal, and performs stop assembling with respect to the vehicle 100.

The robot control unit 315 retreats the component when an assembly error of the component to the vehicle 100 occurs, and outputs an error signal and a retreat completion signal after the retreat completion of the component. "Error signal" means a signal indicating that an assembly error has occurred, in other words, that a stop assembly could not be performed. As a case in which an assembly error occurs, for example, a case in which the setting of the component assembly position is not appropriate or a case in which an error occurs in the position detection of the vehicle 100 may be considered. For example, the robot control unit 315 detects occurrence of an assembly error when the motor load or the impact force at the time of assembling the component is not within a predetermined threshold range.

"Part retraction" means moving a part to a position where it does not contact the vehicle 100. The robot control unit 315 may retract the components in a predetermined distance and direction. The robot control unit 315 may determine a distance and a direction in which the component is to be retracted by using the image acquired by the external sensor 250 or the motor load at the time of execution of the stop assembly, and may retract the component to the determined distance and direction. In addition, the "save completion signal" means a signal indicating that the saving of the component is completed.

Figure 5:
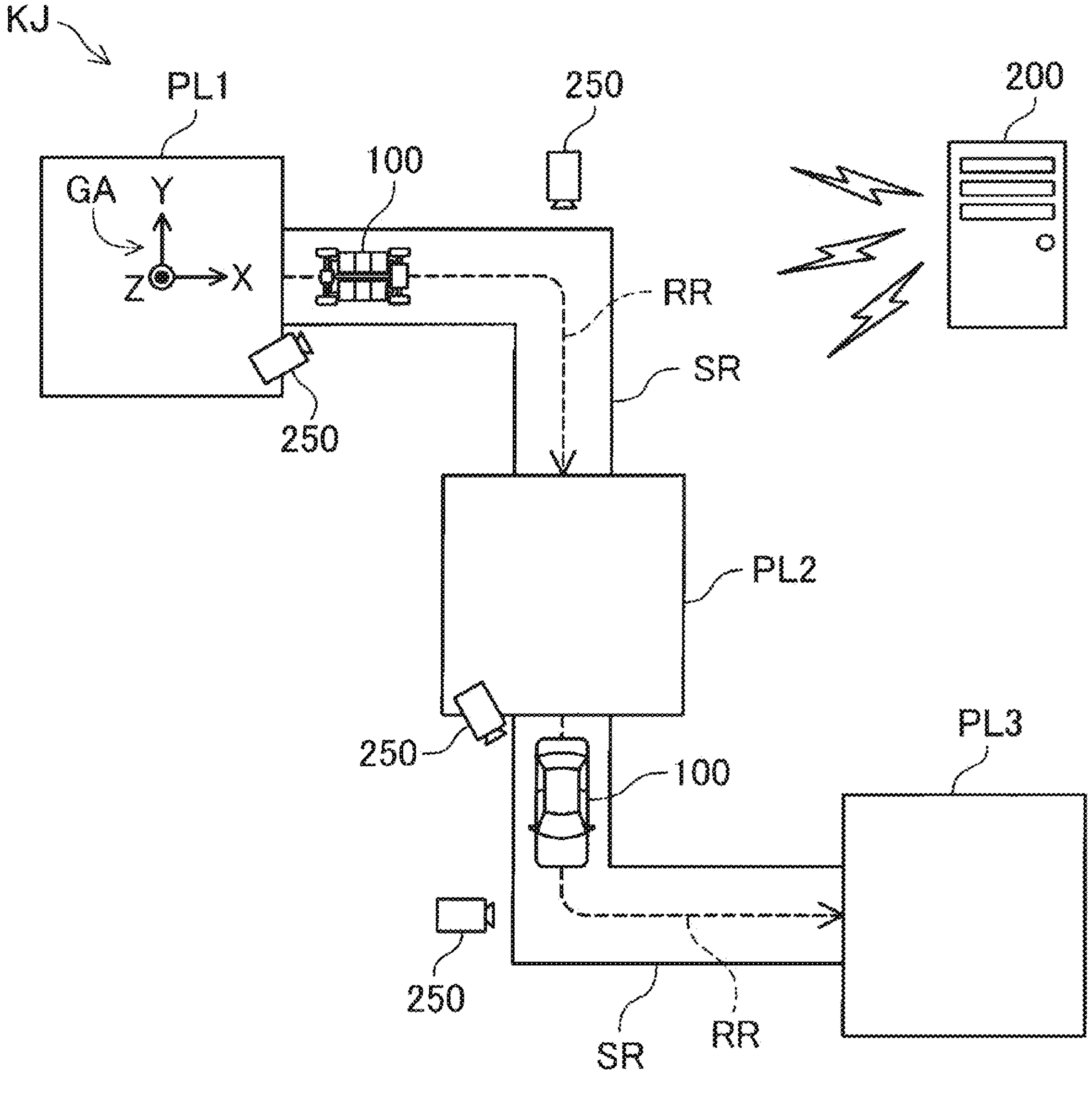
FIG. 5 is an explanatory diagram illustrating a state in which a vehicle travels by unmanned driving in a factory.

FIG. 5 is an explanatory diagram illustrating a state in which the vehicle 100 travels by unmanned driving in the factory KJ. In the present embodiment, the factory KJ includes a first location PL1, a second location PL2, and a third location PL3. The first location PL1, the second location PL2, and the third location PL3 are connected by a traveling path SR on which the vehicle 100 can travel. In the factory KJ, a plurality of external sensors 250 are installed along the traveling path SR.

The first location PL1 is a location where an operation of assembling the vehicle 100 is performed. The vehicle 100 assembled at the first location PL1 are in a state in which they can travel by unmanned driving, in other words, in a state in which they can perform three functions of "running", "turning", and "stopping" by unmanned driving. In the present embodiment, the vehicle 100 assembled in the first location PL1 are in the form of platforms. The vehicle 100 moves from the first location PL1 to the second location PL2 by unmanned driving.

The second location PL2 is a location where an operation of further assembling components to the vehicle 100 is performed. The assembly robots 300 are disposed in the second location PL2. The components to be assembled in the second location PL2 are, for example, vehicle body components, interior components such as seats, headlamps, wipers, and the like. In the present embodiment, the vehicle 100 in which the components are assembled in the second location PL2 is in the form of a finished vehicle. The vehicle 100 moves from the second location PL2 to the third location PL3 by unmanned driving.

The third location PL3 is a location where an operation of inspecting the vehicle 100 is performed. The vehicle 100 that has passed the test in the third location PL3 are shipped from the factory KJ. Note that the vehicle 100 shipped from the factory KJ may not be in the form of a completed vehicle. That is, in the vehicle 100 shipped from the factory KJ, components that are not attached may be present. In this instance, after the vehicle 100 is shipped from the factory KJ, the components that are not attached may be attached to the vehicle 100.

A-2. Drive Control

Figure 6:
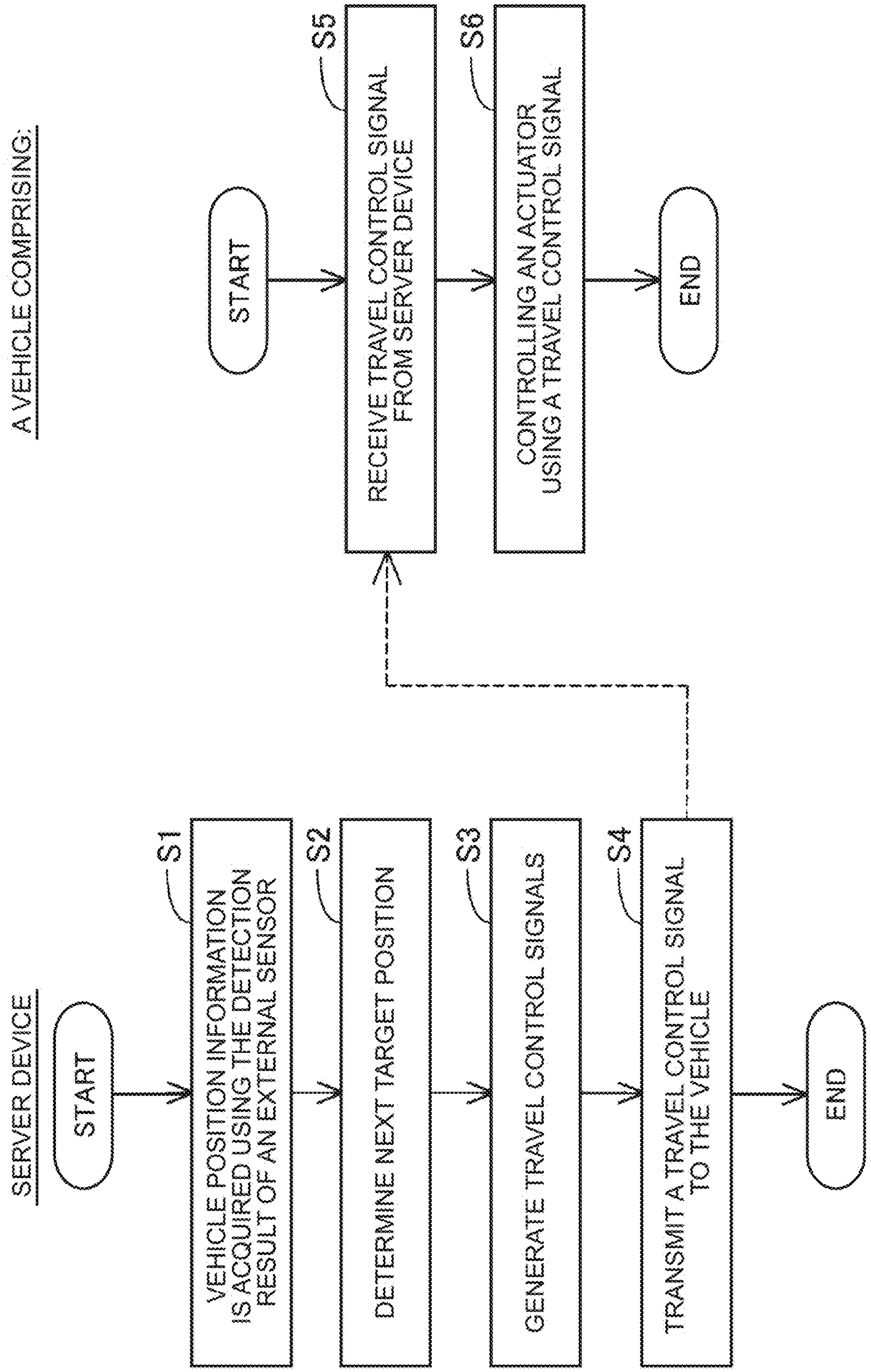
FIG. 6 is a flowchart illustrating a processing procedure of travel control of the vehicle according to the first embodiment.

FIG. 6 is a flowchart illustrating a processing procedure of travel control of the vehicle 100 according to the first embodiment. In S1, the calculation unit 210 acquires the vehicle position data of the vehicle 100 using the detection data outputted from the external sensor 250. The vehicle position information is position information that is a basis for generating a travel control signal. In the present embodiment, the vehicle position information includes the position and orientation of the vehicle 100 in the global coordinate system GA of the factory KJ. Specifically, in S1, the calculation unit 210 acquires the vehicle position data using the captured images acquired from the cameras that are the external sensors 250.

Specifically, in S1, for example, the calculation unit 210 detects the external shape of the vehicle 100 from the captured images. In S1, for example, the calculation unit 210 calculates the coordinates of the positioning points of the vehicle 100 in the coordinate system of the captured images, that is, the local coordinate system. In S1, the calculation unit 210 acquires the position of the vehicle 100 by, for example, converting the calculated coordinates into coordinates in the global coordinate system GA. The outline of the vehicle 100 included in the captured image can be detected by, for example, inputting the captured image into a detection model DM using artificial intelligence. The detection model DM is prepared in the system 10 or outside the system 10, for example, and stored in the memory 202 of the server device 200 in advance. The detection model DM may be, for example, a learned machine learning model learned to implement either semantic segmentation or instance segmentation. As the machine learning model, for example, a convolutional neural network (hereinafter, CNN) learned by supervised learning using a learning dataset can be used. The training data set includes, for example, a plurality of training images including the vehicle 100 and a label indicating which of the regions in the training image indicates the vehicle 100 and the regions other than the vehicle 100. When CNN is learned, the parameters of CNN are preferably updated by back propagation so as to reduce the error between the output-result and-label due to the detection model DM. The calculation unit 210 can acquire the direction of the vehicle 100 using, for example, the optical flow method. In this case, the calculation unit 210 can obtain the direction of the vehicle 100 by estimating the direction based on the direction of the movement vector of the vehicle 100 calculated from the position change of the feature point of the vehicle 100 between the frames of the captured image.

In S2, the vehicle control command unit 212 determines a target position at which the vehicle 100 is to be directed next. In the present embodiment, the target position is represented by the coordinates of X, Y, Z in the global coordinate system GA. In the memory 202 of the server device 200, a reference-route RR that is a route on which the vehicle 100 should travel is stored in advance. The route is represented by a node indicating a starting point, a node indicating a passing point, a node indicating a destination, and a link connecting the respective nodes. The vehicle control command unit 212 uses the vehicle position information and the reference route RR to determine a target position to which the vehicle 100 is to be directed next. The vehicle control command unit 212 determines the target position on the reference route RR ahead of the current position of the vehicle 100.

In S3, the vehicle control command unit 212 generates a travel control signal for causing the vehicle 100 to travel toward the determined target position. The vehicle control command unit 212 calculates the traveling speed of the vehicle 100 from the transition of the position of the vehicle 100, and compares the calculated traveling speed with the target speed. As a whole, the vehicle control command unit 212 determines acceleration so that the vehicle 100 accelerates when the traveling speed is lower than the target speed, and determines acceleration so that the vehicle 100 decelerates when the traveling speed is higher than the target speed. When the vehicle 100 is located on the reference route RR, the vehicle control command unit 212 determines the steering angle and the acceleration so that the vehicle 100 does not deviate from the reference route RR. When the vehicle 100 is not located on the reference route RR, in other words, when the vehicle 100 deviates from the reference route RR, the vehicle control command unit 212 determines the steering angle and the acceleration so that the vehicle 100 returns to the reference route RR.

In S4, the vehicle control command unit 212 transmits the generated travel control signal to the vehicle 100. The vehicle control command unit 212 repeats the acquisition of the position of the vehicle 100, the determination of the target position, the generation of the travel control signal, the transmission of the travel control signal, and the like at a predetermined cycle.

In S5, the vehicle control unit 115 receives the travel control signal transmitted from the server device 200. In S6, the vehicle control unit 115 controls the actuator group 120 using the received travel control signal, thereby causing the vehicle 100 to travel at the acceleration and the steering angle represented by the travel control signal. The vehicle control unit 115 repeats the reception of the travel control signal and the control of the actuator group 120 at a predetermined cycle. According to the system 10 of the present embodiment, the vehicle 100 can be driven by remote control, and the vehicle 100 can be moved without using a conveyance facility such as a crane or a conveyor.

A-3. Assembly Control

Figure 7:
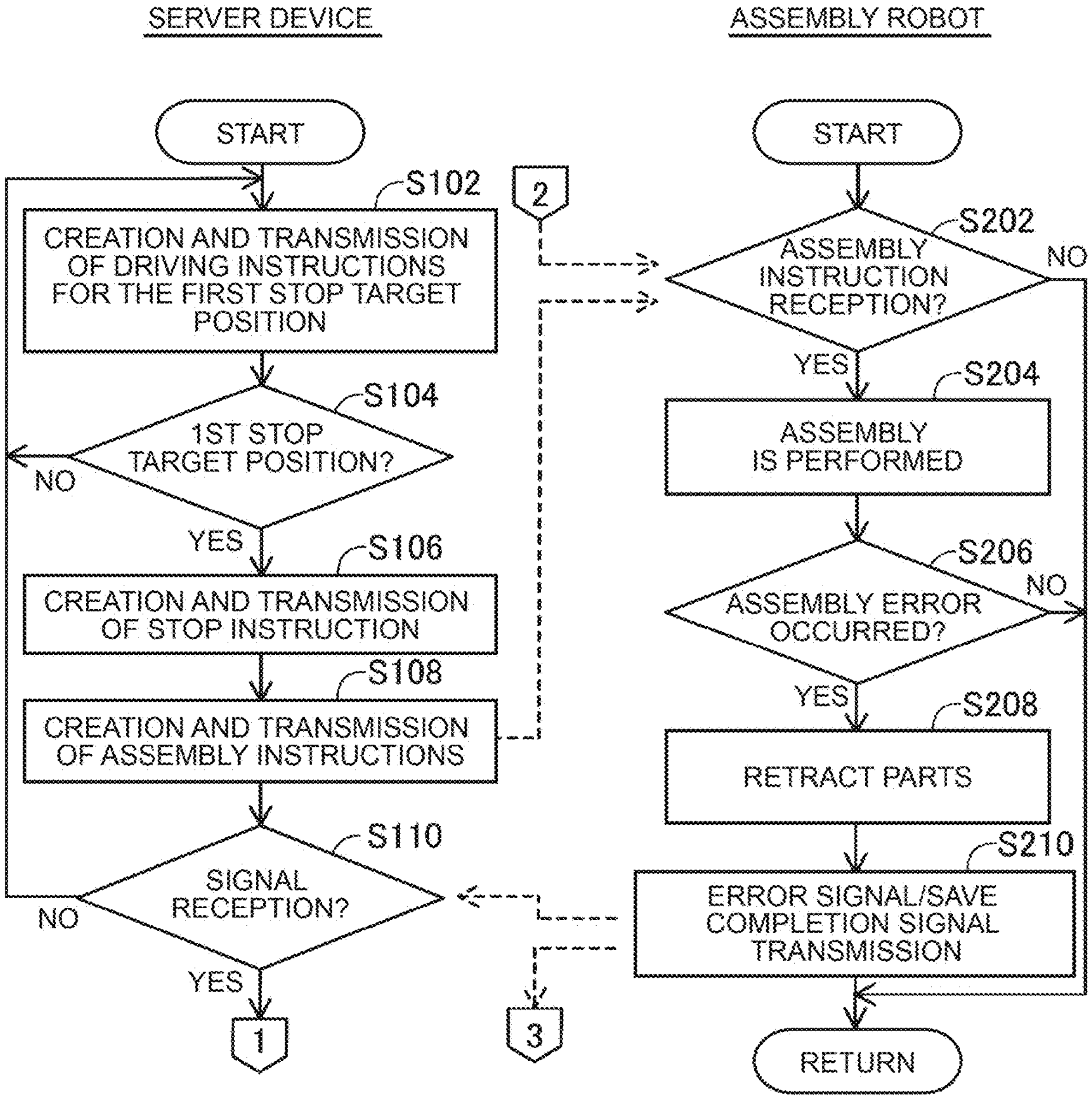
FIG. 7 is a flowchart illustrating a procedure of the component assembly control according to the first embodiment.
Figure 8:
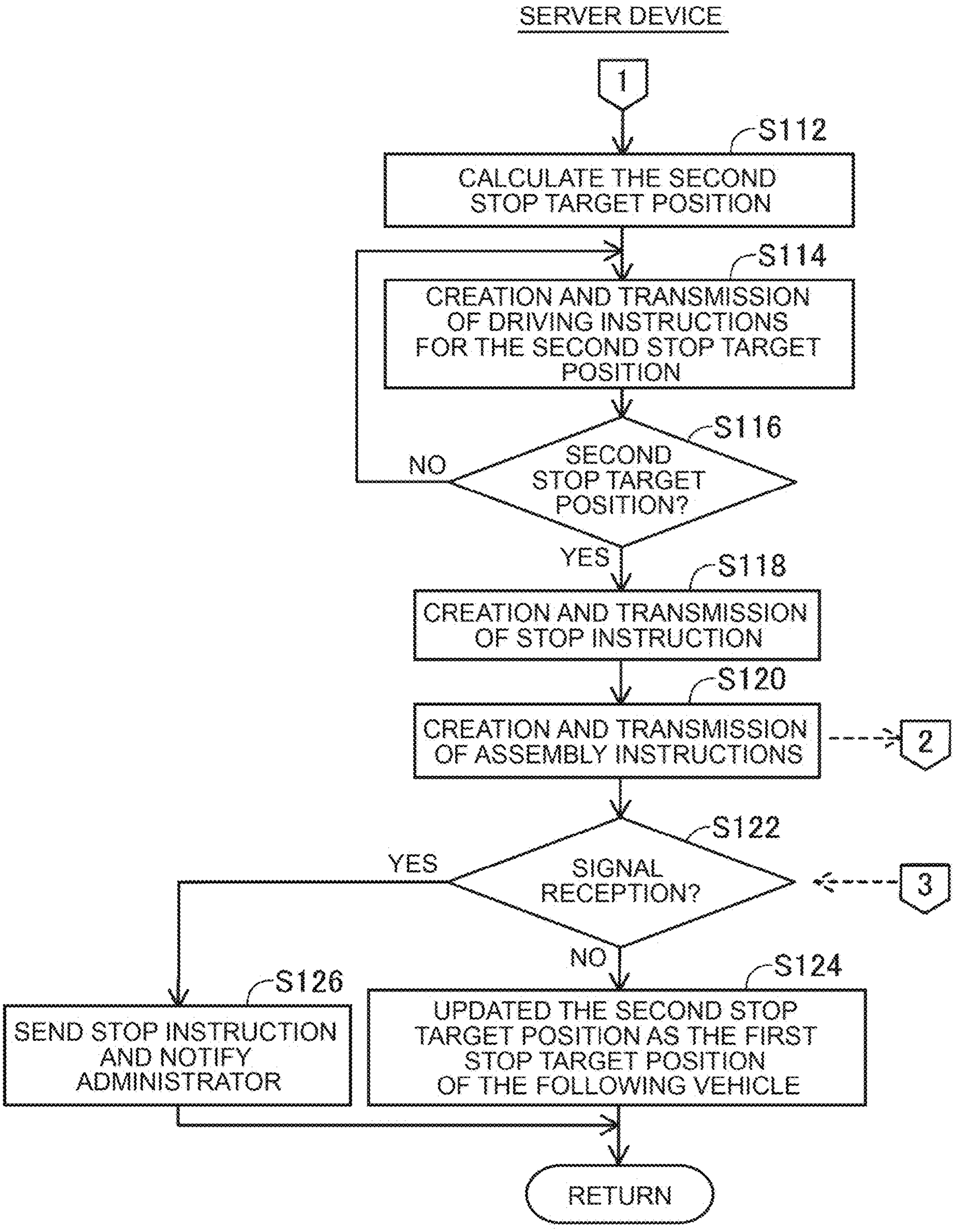
FIG. 8 is a flowchart illustrating a procedure of component assembly control according to the first embodiment.

FIG. 7 and FIG. 8 are flowcharts showing the procedure of the component assembly control according to the first embodiment. In the present embodiment, the above-described travel control is executed as the basic control, and the present control is executed in combination with the travel control. The control illustrated in FIGS. 7 and 8 is started when the system 10 is in an operating state, and is repeatedly executed during the operation of the system 10. In addition, the control in the server device 200 illustrated in FIGS. 7 and 8 and the control in the assembly robot 300 illustrated in FIG. 7 are executed in parallel with each other.

Control in the server device 200 will be described. As illustrated in FIGS. 7 and 8, S126 from S102 is executed in the server device 200. In S102, the vehicle control command unit 212 creates a travel instruction instructing travel toward the first stop target position ST1 set in advance, and transmits the travel instruction to the vehicle 100.

In S104, the vehicle control command unit 212 determines whether or not the vehicle 100 is located at the first stop target position ST1. When it is determined that the vehicle 100 is not located at the first stop target position ST1 (S104: No), the vehicle control command unit 212 executes S102 again. In other words, the vehicle control command unit 212 repeatedly creates and transmits a travel instruction instructing travel toward the first stop target position ST1 until the vehicle 100 reaches the first stop target position ST1.

When it is determined that the vehicle 100 is located at the first stop target position ST1 (S104: Yes), in S106, the vehicle control command unit 212 creates a stop instruction and transmits the stop instruction to the vehicle 100.

In S108, the robot control command unit 218 creates an assembling instruction instructing the stop assembling to the vehicle 100 that is stopped in the first stop target position ST1, and transmits the assembling instruction to the assembly robot 300.

In S110, the error information acquisition unit 214 determines whether or not an error signal and a save completion signal have been received. When it is determined that the error signal and the save completion signal have not been received (S108: No), the above-described S102 is executed again. In other words, the stop assembly in the first stop target position ST1 is executed according to the assembly instruction. If no error has occurred, the vehicle control command unit 212 creates a travel instruction so as to move toward the coordinates set in advance as the first stop target position ST1 in the subsequent process, and transmits the travel instruction to the vehicle 100.

When it is determined that the error signal and the save completion signal have been received (S110: No), in S112 illustrated in FIG. 8, the stop position calculation unit 216 calculates the second stop target position ST2.

In S114, the vehicle control command unit 212 creates a travel instruction instructing travel toward the calculated second stop target position ST2, and transmits the travel instruction to the vehicle 100.

In S116, the vehicle control command unit 212 determines whether or not the vehicle 100 is located at the second target position. When it is determined that the vehicle 100 is not located at the second target position (S116: No), the vehicle control command unit 212 executes S114 again. In other words, the vehicle control command unit 212 repeatedly creates and transmits a travel instruction instructing travel toward the second stop target position ST2 until the vehicle 100 reaches the second stop target position ST2.

When it is determined that the vehicle 100 is located at the second stop target position ST2 (S116: Yes), in S118, the vehicle control command unit 212 creates a stop instruction and transmits the stop instruction to the vehicle 100.

In S120, the robot control command unit 218 creates an assembling instruction instructing the stop assembling to the vehicle 100 that is stopped in the second stop target position ST2, and transmits the assembling instruction to the assembly robot 300. That is, in the present embodiment, when the stop assembly in the first stop target position ST1 fails, the vehicle 100 is moved to the second stop target position ST2 to stop, and then the stop assembly is tried again. As a result, the stopping assembly can be tried again in the second stop target position ST2 that differs from the first stop target position ST1, and the components can be appropriately assembled to the vehicle 100.

In S122, the error information acquisition unit 214 determines whether or not an error signal and a save completion signal have been received. When it is determined that the error signal and the evacuation completion signal have not been received (S122: No), in S124, the vehicle control command unit 212 updates the second stop target position ST2 as the first stop target position ST1 of the succeeding vehicle of the vehicle 100. That is, in the present embodiment, when the stop assembly of the vehicle 100 in the second stop target position ST2 is successful, the second stop target position ST2 is updated as the first stop target position ST1 of the succeeding vehicle of the vehicle 100. Thus, the following vehicle of the vehicle 100 is not stopped at the first stop target position ST1, but can be stopped at the second stop target position ST2 from the beginning. The first stop target position ST1 is a position where the stop assembly with respect to the vehicle 100 has failed. The second stop target position ST2 is a position where the stop assembly with respect to the vehicle 100 is successful. As a result, it is possible to restrain the subsequent vehicle from being unable to be stopped and assembled.

If it is determined that the error signal and the save completion signal have been received (S122: Yes), the process proceeds to S126. In S126, the vehicle control command unit 212 transmits a stop instruction to the vehicle 100, in other words, instructs the vehicle 100 to continue the stopped condition, and notifies the administrator of the stop instruction. Here, the "administrator" is not limited to a person who supervises the management of the system 10, and includes a worker who performs a restoration work in a case where any abnormality occurs in the system 10 and a worker who works in the vicinity of the component assembling process. By continuing the stop condition of the vehicle 100, it is possible to suppress the traveling of the vehicle 100 in a case where the stop assembly again fails in the second stop target position ST2, that is, in a case where there is a possibility that some abnormal condition has occurred. Further, by notifying the administrator, it is possible to restrain the situation in which the abnormality has occurred from being continued.

Control in the assembly robot 300 will be described. In S202 illustrated in FIG. 7, the robot control unit 315 determines whether or not an assembly instruction has been received. When it is determined that the assembling instruction has not been received (S202: No), the robot control unit 315 repeatedly executes S202.

When it is determined that the assembling instruction has been received (S202: Yes), in S204, the robot control unit 315 assembles the components to the vehicle 100.

In S206, the robot control unit 315 determines whether or not an assembly error has occurred. If it is determined that an assembling error has not occurred (S206: No), in other words, if the stopping assembling of the vehicle 100 is successful, the above-described S202 is executed again.

When it is determined that an assembly error has occurred (S206: Yes), the robot control unit 315 retreats the component in S208. In the present embodiment, the robot control unit 315 retreats the components from the time when the assembly error occurs until the assembly instruction is received again, in other words, from the time when the movement of the vehicle 100 to the second stop target position ST2 is started to the time when the movement is completed. Therefore, it is possible to start the movement of the vehicle 100 in a state where the vehicle 100 and the component are not in contact with each other and the traveling of the vehicle 100 is not hindered. Further, while the vehicle 100 is moving in the second stop target position ST2, it is possible to restrain the vehicle 100 and the component from contacting each other and hindering the vehicle 100 from moving.

In S210, the robot control unit 315 transmits an error signal and a save completion signal to the server device 200. The error signal and the save completion signal are transmitted after the saving of the component is completed. Accordingly, it is possible to start the control of moving the vehicle 100 to the second stop target position ST2 after confirming that the retreat of the components is completed in the server device 200. As a result, it is possible to restrain the vehicle 100 and the component from coming into contact with each other and hindering the vehicle 100 from traveling. Thereafter, the above-described S202 is executed again.

According to the system 10 of the embodiment described above, when the component cannot be assembled to the vehicle 100 by the stop assembly in the first stop target position ST1, the vehicle 100 is moved to the second stop target position ST2. Since the stop assembly can be tried again in the second stop target position ST2, the components can be appropriately assembled to the vehicle 100.

In addition, the components may not be assembled to the vehicle 100 due to the stop assembly in the second stop target position ST2. In this case, it is executed by instructing the vehicle 100 to continue the stop state and notifying the administrator that the stop assembly in the second stop target position ST2 has not been performed. Therefore, it is possible to suppress the traveling of the vehicle 100 in a situation in which the stop assembly in the second stop target position ST2 is not possible, that is, in a situation in which there is a possibility that some trouble has occurred. In addition, since the administrator is notified, it is possible to restrain a situation in which some kind of abnormality may have occurred from continuing.

In addition, when the stop assembly is performed in the second stop target position ST2, the following vehicles are instructed to stop in the second stop target position ST2. Therefore, the subsequent vehicle can be stopped from the beginning at the second stop target position ST2 where the stop assembly has been performed, and it is possible to restrain the stop assembly with respect to the subsequent vehicle from becoming impossible.

Further, the second stop target position ST2 is specified by using second information that is information about a position at which the assembling device that performs the stop assembling attempts the stop assembling in the first stop target position ST1. Therefore, the second stop target position ST2 can be set in accordance with the position where the stop assembly is attempted in the first stop target position ST1. As a result, the components can be easily assembled to the vehicle 100 in the second stop target position ST2.

Further, at a point in time prior to the vehicle 100 starting to move to the second stop target position ST2, the component is retracted to a position where it does not touch the vehicle 100. Therefore, it is possible to start the movement of the vehicle 100 in a state where the vehicle 100 and the component are not in contact with each other and the traveling of the vehicle 100 is not hindered.

While the vehicle 100 is moving in the second stop target position ST2, the component is retracted to a position where it does not touch the vehicle 100. Therefore, while the vehicle 100 is moving in the second stop target position ST2, it is possible to restrain the vehicle 100 and the components from contacting each other and hindering the vehicle 100 from moving.

B. Second Embodiment

Figure 9:
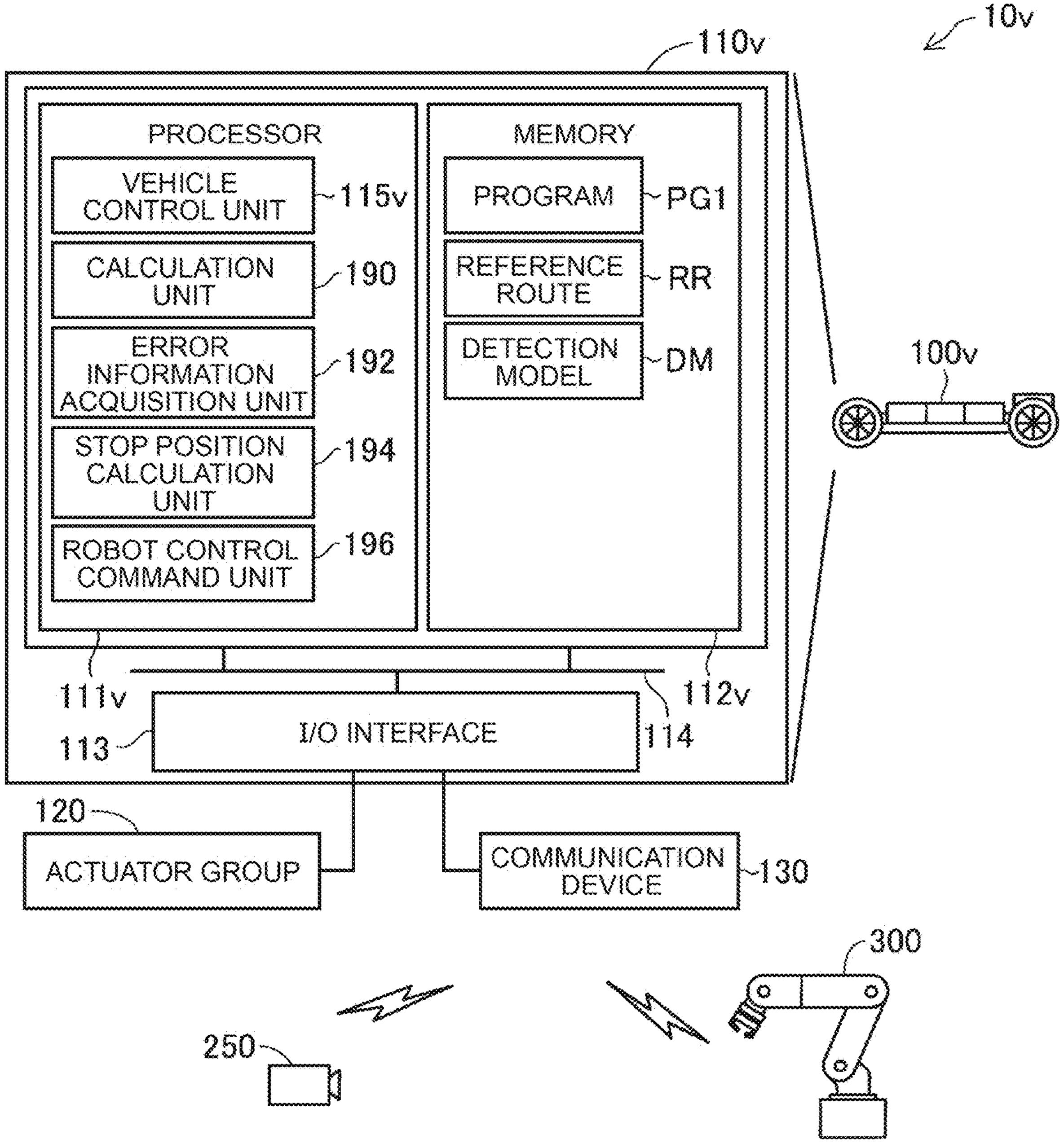
FIG. 9 is a block-diagram illustrating a configuration of a system according to a second embodiment.

FIG. 9 is a block-diagram illustrating a configuration of a system 10*v* according to the second embodiment. The present embodiment differs from the first embodiment in that the server device 200 is not provided in the system 10*v*. Further, the vehicle 100*v* according to the present embodiment can travel by autonomous control of the vehicle 100*v*. Other configurations are the same as those of the first embodiment unless otherwise described.

In the present embodiment, the processor 111*v* of the vehicle control device 110*v* executes the program PG1 stored in the memory 112*v*. Accordingly, the processor 111*v* functions as the vehicle control unit 115*v*, the calculation unit 190, the error information acquisition unit 192, the stopping instruction unit 194, and the robot control command unit 196. The vehicle control unit 115*v* generates a travel control signal using the vehicle position information, and outputs the generated travel control signal to operate the actuator group 120, thereby allowing the vehicle 100*v* to travel by autonomous control. In the present embodiment, in addition to the program PG1, the detection model DM and the reference route RR are stored in advance in the memory 112*v*. The vehicle control unit 115*v* in the second embodiment corresponds to a "control command unit" in the present disclosure, and the vehicle control device 110*v* corresponds to a "control device" in the present disclosure.

In the present embodiment, when the stop assembly is successful in the second stop target position ST2, the second stop target position ST2 is transmitted to the following vehicle in which 100*v* is the second stop target position. Accordingly, the second stop target position ST2 is updated as the first stop target position ST1 of the following vehicle of the vehicle 100. According to such a configuration, as in the first embodiment, it is possible to restrain the vehicle from being unable to be stopped and assembled to the following vehicle. This is because the succeeding vehicle of the vehicle 100 is not stopped at the first stop target position ST1 but can be stopped at the second stop target position ST2 from the beginning. The first stop target position ST1 is a position where the stop assembly with respect to the vehicle 100 has failed. The second stop target position ST2 is a position where the stop assembly with respect to the vehicle 100 is successful.

Figure 10:
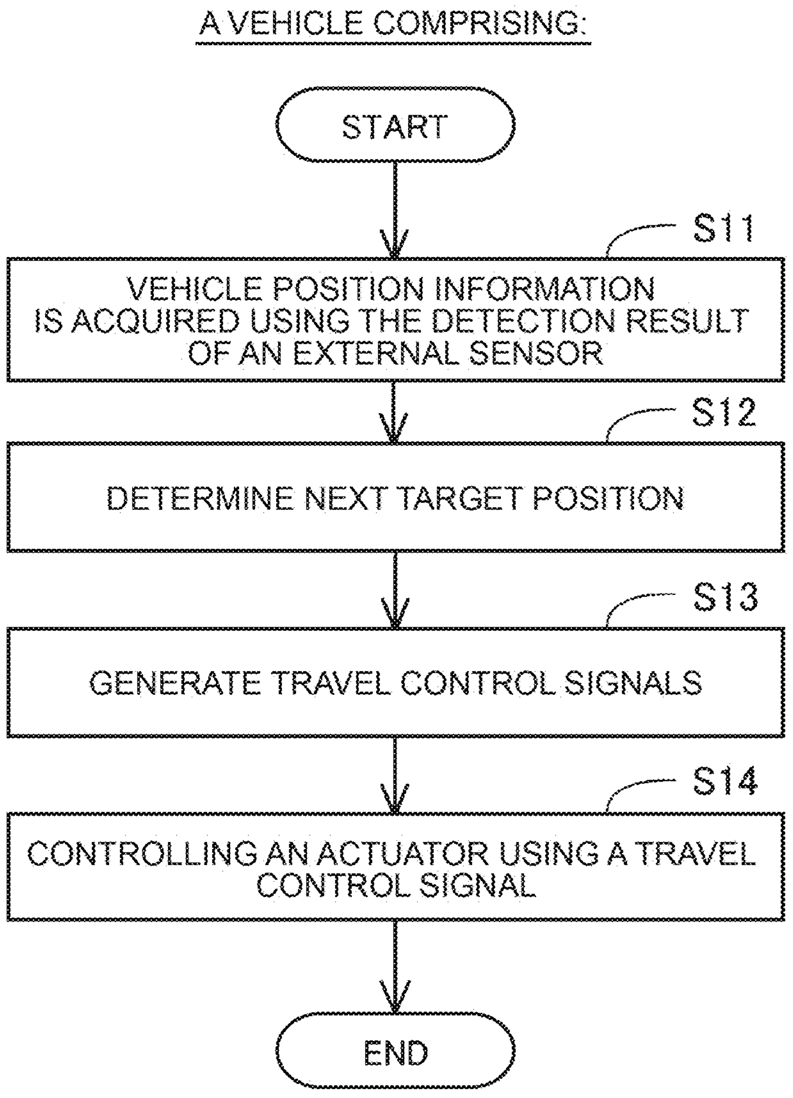
FIG. 10 is a flowchart illustrating a processing procedure of travel control of the vehicle according to the second embodiment.

FIG. 10 is a flow chart showing a process sequence of travel control of the vehicle 100*v* according to the second embodiment. In S11, the processor 111*v* acquires the position information of the vehicle by using the detection result outputted from the camera which is the external sensor 250. In S11 according to the present embodiment, the processor 111*v* acquires the vehicle position data using the captured images and the vehicle speed as in S1 of FIG. 3. In S12, the processor 111*v* determines the target position to which the vehicle 100*v* should be headed next. In S13, the processor 111*v* generates a travel control signal for causing the vehicle 100*v* to travel toward the determined target position. In S14, the processor 111*v* controls the actuator group 120 by using the generated travel control signal, thereby causing the vehicle 100*v* to travel in accordance with the parameter represented by the travel control signal. The processor 111*v* repeats acquiring the vehicle position information, determining the target position, generating the travel control signal, and controlling the actuator group 120 at a predetermined cycle. According to the system 10*v* of the present embodiment, the vehicle 100*v* can be caused to travel by autonomous control of the vehicle 100*v* without remotely controlling the vehicle 100*v* by the server device 200. In addition, according to 10*v* of the present embodiment, as in the above-described embodiment, it is possible to appropriately assemble the components to the vehicle 100*v*. This is because even when the components cannot be assembled to the vehicle 100*v* due to the stop assembly in the first stop target position ST1, the stop assembly can be tried again in the second stop target position ST2.

C. Other Embodiments

C1

In the above-described embodiment, the second stop target position ST2 is calculated by the stop position calculation unit 216, but the present disclosure is not limited to this. The second stop target position ST2 may be set in advance as a position spaced apart from the first stop target position ST1 by a certain distance. In this embodiment, the server device 200 may not include the stop position calculation unit 216. According to this aspect as well, when the stop assembly in the first stop target position ST1 fails, the stop assembly can be tried again in the second stop target position ST2, and the components can be appropriately assembled to the vehicle 100. In addition, since the calculation of the second stop target position ST2 is not necessary, it is possible to suppress the process loads in the server device 200.

C2

In the above-described embodiment, the error information acquisition unit 214 acquires an error signal as the assembly error information, but the present disclosure is not limited to this. For example, the error information acquisition unit 214 may acquire the detection result of the external sensor 250 as the assembly error information. In this embodiment, the error information acquisition unit 214 may detect the positional relationship between the vehicle 100 and the component in the image captured by the camera as the external sensor 250, and determine whether the component is assembled to the vehicle 100. According to this embodiment, the same effects as those of the above-described embodiment can be obtained.

Further, in the above-described embodiment, the error information acquisition unit 214 acquires an error signal indicating that the stop assembly cannot be performed as the assembly error information, but the present disclosure is not limited to this. Instead of the error signal, the error information acquisition unit 214 may acquire an assembly completion signal indicating that the stop assembly has been completed. According to this aspect as well, it can be determined that the assembly can be stopped when the assembly completion signal is received after the transmission of the assembly instruction. On the other hand, when the assembly completion signal is not received even after a predetermined time has elapsed after the transmission of the assembly instruction, it can be determined that the stop assembly cannot be performed. That is, in general, it can be said that the error information acquisition unit 214 acquires information on the success or failure of the stop assembly.

C3

In the above-described embodiment, the server device 200 controls the vehicle 100 that is the component assembly target in accordance with whether or not the stop assembly is successful, but the present disclosure is not limited thereto. The server device 200 may also perform control according to the success or failure of the stop assembly for a vehicle other than the vehicle 100 that is the component assembly target. For example, when the stop assembly in the second stop target position ST2 fails, the server device 200 may transmit, in addition to the above-described S126 illustrated in FIG. 8, a travel control signal instructing stop or deceleration to the following vehicles. The following vehicle is another vehicle that travels following the vehicle 100. According to this aspect, in a situation where the stop assembly at the second stop target position is not possible, that is, in a situation where there is a possibility that some abnormality has occurred, it is possible to suppress the travel of the following vehicle. In addition, it is possible to restrain the distance between the moving body that has failed the stop assembly and the subsequent moving body from becoming small. Note that the server device 200 may execute only a part of the instruction to continue the stop condition to the vehicle 100, the instruction to decelerate or stop to the succeeding vehicle, and the notification to the administrator that the stop assembly in the second stop target position ST2 has not been performed.

C4

In the above-described embodiment, the assembly robot 300 operates in accordance with the operation control signal received from the server device 200, but the present disclosure is not limited thereto. The assembly robot 300 may further include an operation control signal generation unit that generates an operation control signal, and may execute an operation based on the operation control signal generated by itself. In this embodiment, the operation control signal generation unit receives, for example, a signal instructing the start of the assembly control from the server device 200 as an assembly instruction. The motion control signal generation unit identifies the assembly position of the component with respect to the vehicle 100 by using a detection result of a sensor (not shown) such as a camera included in the assembly robot 300, and autonomously generates a motion control signal. According to this aspect, it is unnecessary to generate an operation control signal in the server device 200, and it is possible to suppress complication of processing on the server device 200 side.

In addition, the operation control signal generation unit may generate the operation control signal without receiving the assembling instruction from the robot control command unit 218. For example, the motion control signal generation unit may generate a motion control signal when it is detected that the vehicle 100 is positioned at the component assembly position by using a detection result of a sensor (not shown) such as a camera included in the assembly robot 300.

In other words, the assembly robot 300 may realize the assembling operation of the component to the vehicle 100 regardless of an instruction from another device. In other words, the assembly robot 300 may realize the assembling operation of the component to the vehicle 100 regardless of an instruction from another device. In this embodiment, the server device 200 does not need to include the robot control command unit 218. According to this embodiment, the same effects as those of the above-described embodiment can be obtained.

C5

In the above-described embodiment, when an assembly error occurs, the robot control unit 315 transmits the error signal and the save completion signal, but the present disclosure is not limited to this. The robot control unit 315 may transmit only an error signal. According to this configuration, it is possible to notify the server device 200 of the occurrence of the assembly error, and it is possible to attempt the stop assembly in the second stop target position ST2.

C6

In each of the above embodiments, the external sensor 250 is a camera. On the other hand, the external sensor 250 may not be a camera, and may be, for example, a distance measuring device. The distance measuring device may be, for example, a LiDAR (Light Detection And Ranging). In this case, the detection result output by the external sensor 250 may be three-dimensional point cloud data representing the vehicle 100. In this case, the server device 200 or the vehicle 100 may acquire the vehicle position information by template matching using three-dimensional point cloud data as a detection result and reference point cloud data prepared in advance.

C7

In the first embodiment, the server device 200 executes processing from acquisition of vehicle position information to generation of a travel control signal. On the other hand, at least a part of the processing from the acquisition of the vehicle position information to the generation of the travel control signal may be executed by the vehicle 100. For example, the following forms (1) to (3) may be used.

(1) The server device 200 may acquire the vehicle position information, determine a target position to which the vehicle 100 should be heading next, and generate a route from the current position of the vehicle 100 represented by the acquired vehicle position information to the target position. The server device 200 may generate a route to a target position between the current location and the destination, or may generate a route to the destination. The server device 200 may transmit the generated route to the vehicle 100. The vehicle 100 may generate a travel control signal so that the vehicle 100 travels on the route received from the server device 200, and control the actuator group 120 using the generated travel control signal.

(2) The server device 200 may acquire the vehicle position information and transmit the acquired vehicle position information to the vehicle 100. Vehicle 100 may determine a target position to which vehicle 100 should be heading next. The vehicle 100 may generate a route from the current position of the vehicle 100 to the target position represented by the received vehicle position information. The vehicle 100 may generate a travel control signal so that the vehicle 100 travels on the generated route, and control the actuator group 120 using the generated travel control signal.

(3) In the above embodiments (1) and (2), an internal sensor may be mounted on the vehicle 100, and a detection result output from the internal sensor may be used for at least one of generation of a route and generation of a travel control signal. The internal sensor is a sensor mounted on the vehicle 100. The internal sensor may include, for example, a sensor that detects a motion state of the vehicle 100, a sensor that detects an operation state of each unit of the vehicle 100, and a sensor that detects an environment around the vehicle 100. Specifically, the inner sensor may include, for example, a camera, a LiDAR, a millimeter-wave radar, an ultrasonic sensor, a GPS sensor, an accelerometer, a gyroscope, and the like. For example, in the embodiment (1), the server device 200 may acquire the detection result of the internal sensor and reflect the detection result of the internal sensor in the path when generating the path. In the aspect (1), the vehicle 100 may acquire the detection result of the internal sensor and reflect the detection result of the internal sensor in the travel control signal when the travel control signal is generated. In the aspect (2), the vehicle 100 may acquire the detection result of the internal sensor and reflect the detection result of the internal sensor in the path when generating the path. In the aspect (2), the vehicle 100 may acquire the detection result of the internal sensor and reflect the detection result of the internal sensor in the travel control signal when the travel control signal is generated.

C8

In the second embodiment, an internal sensor may be mounted on the vehicle 100*v*, and a detection result outputted from the internal sensor may be used for at least one of generation of a route and generation of a travel control signal. For example, the vehicle 100*v* may acquire the detection result of the internal sensor and reflect the detection result of the internal sensor in the route when generating the route. The vehicle 100*v* may acquire the detection result of the internal sensor and reflect the detection result of the internal sensor in the travel control signal when the travel control signal is generated.

C9

In the above-described embodiment in which the vehicle 100 can travel by autonomous control, the vehicle 100 acquires the vehicle position information using the detection result of the external sensor 250. On the other hand, an internal sensor may be mounted in the vehicle 100. The vehicle 100 may acquire the vehicle position information by using the detection result of the internal sensor. Vehicle 100 may determine a target position to which vehicle 100 should be heading next. The vehicle 100 may generate a route from the current position of the vehicle 100 to the target position represented by the acquired vehicle position information. The vehicle 100 may generate a travel control signal for traveling on the generated route, and control the actuator of the vehicle 100 using the generated travel control signal. In this case, the vehicle 100 can travel without using any detection result of the external sensor 250. Note that the vehicle 100 may acquire the target arrival time and the traffic jam information from the outside of the vehicle 100 and reflect the target arrival time and the traffic jam information on at least one of the route and the travel control signal. In addition, all of the functional configurations of the system 10 may be provided in the vehicle 100. That is, the processing implemented by the system 10 in the present disclosure may be implemented by the vehicle 100 alone. In such a configuration, whether or not the stopping assembly for the vehicle 100 is successful can also be determined by using, for example, the status of connecting the component to the vehicle-mounted LAN.

C10

In the first embodiment, the server device 200 automatically generates a travel control signal to be transmitted to the vehicle 100. On the other hand, the server device 200 may generate a travel control signal to be transmitted to the vehicle 100 in accordance with an operation of an external operator located outside the vehicle 100. For example, an external operator may operate a control device including a display, a steering, an accelerator pedal, a brake pedal, and a communication device. The server device 200 may generate a travel control signal corresponding to an operation applied to the control device. The display displays a captured image output from the external sensor 250. The steering, accelerator pedal, and brake pedal are configured to remotely operate the vehicle 100. The communication device is configured to communicate with the server device 200 by wired communication or wireless communication.

C11

In each of the above-described embodiments, the vehicle 100 may have a configuration that can be moved by unmanned driving, and may be, for example, in the form of a platform having a configuration described below. Specifically, the vehicle 100 performs three functions of "running," "turning," and "stopping" by unmanned driving. For this purpose, the vehicle 100 may include at least a control device for controlling the travel of the vehicle 100 and an actuator such as a drive device, a steering device, and a braking device. When the vehicle 100 acquires information from the outside for unmanned driving, the vehicle 100 may further include a communication device. That is, the vehicle 100 that can be moved by the unmanned driving may not be equipped with at least a part of an interior component such as a driver's seat or a dashboard. In the vehicle 100, at least a part of an exterior component such as a bumper or a fender may not be attached, and the body shell may not be attached. In this instance, the remaining components, such as the body shell, may be mounted to the vehicle 100 until the vehicle 100 is shipped from the factory KJ. The remaining components, such as the body shell, may be mounted to the vehicle 100 after the vehicle 100 is shipped from the factory KJ with the remaining components, such as the body shell, not being mounted to the vehicle 100. Each of the components may be mounted from any direction, such as the upper side, lower side, front side, rear side, right side or left side of the vehicle 100, each may be mounted from the same direction, or may be mounted from a different direction. It should be noted that the position determination can also be performed for the form of the platform in the same manner as the vehicle 100 according to the first embodiment.

C12

The vehicle 100 may be manufactured by combining a plurality of modules. A module refers to a unit composed of one or more components grouped according to the configuration and function of the vehicle 100. For example, the platform of the vehicle 100 may be manufactured by combining a front module, a central module, and a rear module. The front module constitutes the front of the platform. The central module constitutes the central part of the platform. The rear module constitutes the rear of the platform. The number of modules constituting the platform is not limited to three, and may be two or less or four or more. In addition to or instead of the platform, a different part of the vehicle 100 from the platform may be modularized. Further, the various modules may include any exterior parts such as bumpers and grills, and any interior parts such as sheets and consoles. In addition, not only the vehicle 100 but also a moving object of an arbitrary mode may be manufactured by combining a plurality of modules. Such a module may be manufactured, for example, by joining a plurality of parts by welding, a fixture, or the like, or may be manufactured by integrally molding at least a part of the module as one part by casting. Molding techniques for integrally molding at least a portion of a module as one part are also referred to as giga cast or mega cast. By using the giga cast, each part of the moving body, which has been conventionally formed by joining a plurality of parts, can be formed as one part. For example, the front module, the central module, and the rear module described above may be manufactured using giga cast.

C13

Transporting the vehicle 100 by using the traveling of the vehicle 100 by the unmanned driving is also referred to as "self-propelled conveyance". A configuration for realizing self-propelled conveyance is also referred to as a "vehicle remote control autonomous traveling conveyance system". Further, a production method of producing the vehicle 100 by using self-propelled conveyance is also referred to as "self-propelled production". In self-propelled manufacturing, for example, at least a part of conveyance of the vehicle 100 is realized by self-propelled conveyance in a factory KJ that manufactures the vehicle 100.

C14

In each of the above-described embodiments, some or all of the functions and processes implemented in software may be implemented in hardware. In addition, some or all of the functions and processes implemented in hardware may be implemented in software. For example, various circuits such as an integrated circuit and a discrete circuit may be used as hardware for realizing various functions in the above-described embodiments.

The present disclosure is not limited to each of the above embodiments, and can be realized by various configurations without departing from the spirit thereof. For example, the technical features in the embodiments corresponding to the technical features in the respective embodiments described in Summary can be appropriately replaced or combined in order to solve some or all of the above-described problems. For example, the technical features in the embodiments corresponding to the technical features in the respective embodiments described in Summary can be appropriately replaced or combined in order to achieve some or all of the above-described effects, and can be appropriately deleted unless the technical features are described as essential in the present specification.

What is claimed is:

1. A control device that controls installation of a component to a mobile body that is configured to travel through unattended driving in a process of manufacturing the mobile body, the control device comprising a processor configured to:

instruct the mobile body to stop at a first stop target position at which stop installation is to be executed, the stop installation being installation of the component to the mobile body that has been stopped;

acquire first information about whether the stop installation is successful in the first stop target position;

instruct the mobile body to move to a second stop target position at which the stop installation is to be executed again, when the first information about a failure of the stop installation at the first stop target position is acquired;

acquire second information about whether the stop installation is successful in the second stop target position; and instruct the mobile body to maintain a stopped state, when the second information about a failure of the stop installation at the second stop target position is acquired.

2. The control device according to claim 1, wherein when the second information about the failure of the stop installation at the second stop target position is acquired, the processor is further configured to instruct another mobile body traveling following the mobile body to decelerate.

3. The control device according to claim 1, wherein the processor is further configured to specify the second stop target position using information about a position at which an installation device that executes the stop installation attempted the stop installation at the first stop target position.

4. The control device according to claim 1, wherein before the mobile body moves to the second stop target position, the component is retracted to a position at which the component does not contact the mobile body.

5. The control device according to claim 1, wherein while the mobile body is moving to the second stop target position, the component is retracted to a position at which the component does not contact the mobile body.

6. A system that controls installation of a component to a mobile body that is configured to travel through unattended driving in a process of manufacturing the mobile body, the system comprising a processor configured to:

instruct the mobile body to stop at a first stop target position at which stop installation is to be executed, the stop installation being installation of the component to the mobile body that has been stopped;

acquire first information about whether the stop installation is successful in the first stop target position;

instruct the mobile body to move to a second stop target position at which the stop installation is to be executed again, when the first information about a failure of the stop installation at the first stop target position is acquired;

acquire second information about whether the stop installation is successful in the second stop target position; and instruct the mobile body to maintain a stopped state, when the second information about a failure of the stop installation at the second stop target position is acquired.

7. A control method of controlling installation of a component to a mobile body that is configured to travel through unattended driving in a process of manufacturing the mobile body, the control method comprising:

instructing the mobile body to stop at a first stop target position at which stop installation is to be executed, the stop installation being installation of the component to the mobile body that has been stopped;

acquiring first information about whether the stop installation is successful in the first stop target position;

instructing the mobile body to move to a second stop target position at which the stop installation is to be executed again, when the first information about a failure of the stop installation at the first stop target position is acquired;

acquire second information about whether the stop installation is successful in the second stop target position; and instructing the mobile body to maintain a stopped state, when the second information about a failure of the stop installation at the second stop target position is acquired.

* * * * *